United States Patent [19]

Buntschuh et al.

[11] 3,769,589

[45] Oct. 30, 1973

[54] RATE AIDED RANGING AND TIME DISSEMINATION RECEIVER

[75] Inventors: Robert Frank Buntschuh, Hightstown; Henry George Rouland, Cherry Hill, both of N.J.

[73] Assignee: RCA Corporation, New York, N.Y.

[22] Filed: Nov. 16, 1971

[21] Appl. No.: 208,762

[52] U.S. Cl. .................. 325/419, 325/423, 325/330, 331/55, 343/7.3, 343/12

[51] Int. Cl. .................................................. H04b 1/16

[58] Field of Search ...................... 179/15 BS, 15 FS; 325/416–423, 49, 50, 329–331, 346, 433; 331/55, 56; 332/45; 343/179, 7.3, 12, 14, 114

[56] References Cited

UNITED STATES PATENTS

| | | | |
|---|---|---|---|
| 3,343,163 | 9/1967 | Crooks et al. | 343/12 R |
| 2,991,467 | 7/1961 | Clarke | 343/7.3 |
| 3,461,452 | 8/1969 | Welter | 343/12 R |
| 3,271,767 | 9/1966 | Larky | 343/7.3 |
| 3,287,725 | 11/1966 | Webb | 343/14 |
| 3,199,104 | 8/1965 | Miller | 343/12 R |

*Primary Examiner*—Albert J. Mayer
*Attorney*—Edward J. Norton

[57] ABSTRACT

A receiver is described for processing tone ranging signals from a time dissemination satellite such as TIMATION II. The receiver derives either receiver-station time (clock synchronization) or position location of the receiver-station with respect to the satellite with significant accuracy. The receiver generates a set of range tones as duplicates of those received from a satellite. They are developed as frequency coherent from a phase lock loop synchronized to the signal carrier frequency. A second loop, having a frequency synthesizer locked to the carrier loop, a mixer, a narrow band amplifier and a phase detector mix the locally generated range tones with a local oscillator signal which is frequency coherent with the carrier. This mixer output is then mixed with the receiver modulation to null out error between the received and local range tones. An output signal consisting of the lowest range tone signal is representative of the tone modulation from the satellite.

Coherent processing by mixing at the front-end of the detector amplifier in the preferred embodiment allows for automatic calibration of non-zero receiver propagation delays, and the use of narrow band IF amplifiers thereby effecting high levels of unwanted signal rejection. The use of synthesized range tones allows for continuous time-delay or ranging measurements even though the satellite range tones are not continuously transmitted.

7 Claims, 6 Drawing Figures

RATE AIDED RANGING AND TIME DISSEMINATION RECEIVER

The invention herein described was made in the coarse of or under a contract or subcontract thereunder with the Department of the Navy.

BACKGROUND OF THE INVENTION

1. Field of the Invention

This invention relates to Doppler rate-aided ranging and time dissemination receivers and more particularly to such receivers utilized in navigational systems utilizing satellites.

2. Description of the Prior Art

The performance of precision ranging receivers of range tone modulation signals has been traditionally hampered by the presence of a large Doppler shift requiring large pre-detection bandwidths and precisely controlled phase characteristics of filters in the receiver.

A world-wide synchronized clock system utilizing satellites is based on the principle of measuring the elapsed time of signal transmission from a satellite to a user receiver station on or near the earth's surface. The accuracy that can be achieved in this system to reproduce a clock pulse approaching the precise time of a pulse from a master clock will depend upon the resolution that can be achieved in the synchronization of the signals to a reference as well as the assurance that ambiguities are eliminated. Many proposals have been suggested for systems and techniques for accomplishing the general purpose of accurate synchronized clocks. One such system has been proposed and is in experimental operation under the sponsorship of the United States Navy, in a system known as TIMATION II. A satellite orbiting at about 600 nautical miles above the earth's surface will have its electromagnetic signal transmission received on or near the earth's surface in about 10 milliseconds. The delay time for such transmissions, commonly known as ($\tau$) tau, are about 10 milliseconds for transmission from a horizon location from the satellite to the user whereas a transmission from the orbit zenith is about 3.6 milliseconds.

Consider a signal being transmitted on a continuous wave basis from a satellite modulated with a frequency of 100 Hz. The period of each cycle of the modulation is 10 milliseconds which corresponds to the maximum value of tau previously computed. Assuming a signal to noise ratio that would tolerate noise, phase jitter, and other effects causing error, a one percent accuracy in period measurement has been determined to by physically realizable and practical. One percent of a 10 millisecond period is 100 microseconds which is still intolerable and unacceptable for accurate time transfer or passive ranging. In order to achieve better resolution it has been proposed to transmit other reference signals, such as a carrier, a plurality of side band signals more commonly termed range tone signals. By correlating the phase of each of such range tone signals with the carrier a basis for resolving the tau to increasing degrees of accuracy may be achieved, accuracies approaching nanoseconds. Consider the case of two phase coherent range tones, the frequency difference of the two tones being related by a ratio 10 to 1. Common zero crossings of these two tones will occur once each 10 cycles of the higher frequency tone. Therefore, the ranging precision will be based on one percent accuracy measurements of the higher range tone period, with ambiguity being resolved by the lower range tone period.

Conventional techniques for processing such signals have been to use a coherent phase locked receiver that tracks the changing frequency of the carrier and also passes the range tone side band information in a relatively wide band intermediate frequency (IF) amplifier. Demodulation of the range tones in such conventional systems occurs at the phase detector in the phase lock loop. The difficulty with such an approach is that the relatively wide bandwidth of the intermediate frequency amplifier allows many undesired signals to be amplified along with the desired signals and also allows jamming signals to be received to defeat the system. Such conventional receivers also distort the phase correlation between range tone and carrier frequencies due first to the nonlinear effects of the wide band intermediate frequency amplifier and additionally due to the instability in propagation delay of such intermediate frequency amplifiers.

SUMMARY OF THE INVENTION

According to the present invention, a narrow band, phase locked, carrier tracking receiver is used to track, in frequency only, the carrier frequency of the modulated transmission. This phase lock receiver provides a reference oscillator which is phase coherent with the incoming carrier frequency and tracks the changes in the incoming carrier frequency that are caused due to Doppler change. By synthesizing, from this carrier frequency coherent oscillator, a set of range tones which matches in frequency those range tones being transmitted by the satellite, the set of range tones will track in Doppler shift the received set of tones. Since the locally generated set of range tones is at the precise frequency of the incoming set of received range tones, the phase correlation of the locally generated set of tones with the incoming set of tones is not hampered by large Doppler frequency offsets. This allows the use of first order, phase locked loop technology to be utilized in this correlation process. The receiver provides for reception of the modulation which consists of five range tones related to each other by the ratio of 10 to 1. Each of these tones is transmitted in a 0.4 of a second burst from the satellite, the carrier being transmitted continuously at a frequency of 399.4 MHz. Each range tone, when received from the satellite, is correlated with its corresponding locally generated range tone by the use of a very narrow band, phase locked loop, which is secondary to the carrier tracking loop. All range tones are each correlated with the corresponding range tone from the satellite to the same order of accuracy of one percent. However, as the tones are each of a higher frequency then the previous tone, the accuracy of the overall correlation of the range tone set increases as each range tone frequency is increased. The typical highest range tone frequency, is at 900 kHz and allows an overall correlation accuracy of approximately 11 nanoseconds.

DETAILED DESCRIPTION OF A PREFERRED EMBODIMENT

Figure 1:
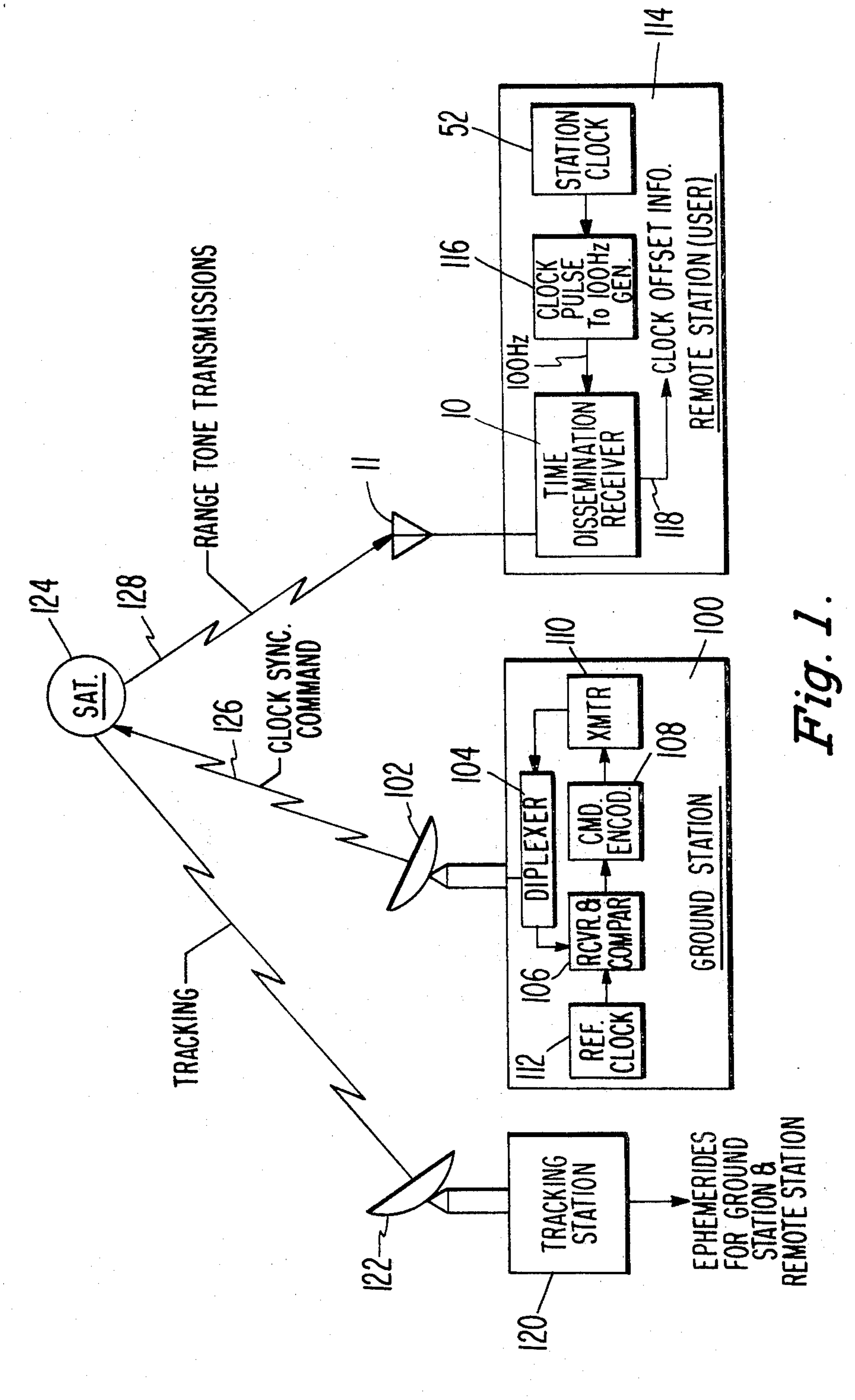
FIG. 1 is a system for ranging and clock synchronization using a satellite.

The invention is to be described as embodied for operation in a system comprising a ground station transmitting command signals to a satellite for controlling transmissions to a remote user station aboard a ship or aircraft as illustrated in FIG. 1. The ground station 100 having a tracking antenna 102 is provided with a diplexer coupled to a receiver 106, a command encoder 108, and a transmitter 110. A reference clock 112 provides the time synchronizing clock pulses to the receiver 106.

A receiver 106 functions to compare the received timing information from the satellite with the reference clock pulse in the ground station. This initial comparison is then compared with the anticipated time difference, which is the elapsed time due to signal transit from the satellite to the ground station. An error in this final comparison is then translated into a command which corrects the satellite timing so as to reduce this error to zero. This command, for encoder 108, is then applied to the transmitter 110 by the diplexer and then by the antenna 102 to the satellite.

A remote user receiver station 114 located at a fixed ground point, aboard a ship, or aboard an aircraft, has a receiver 10, a clock pulse to 100 Hz generator 116, a station clock 52 and an output 118 from the receiver 10 for providing clock offset or error information used for timing or navigational purposes, as will be described.

A tracking station 120 with a tracking antenna 122 is arranged to track the satellite 124 orbiting above the earth. Clock synchronized command signals are transmitted over paths 126 to the satellite and are retransmitted over path 128 for reception by remote stations 114. The satellite 124 contains a clock that is synchronized to the reference clock 112 by suitable ground station commands. The system as just described is representative of the U.S. Naval Satellite Time Dissemination system more commonly known as TIMATION II.

Figure 2:
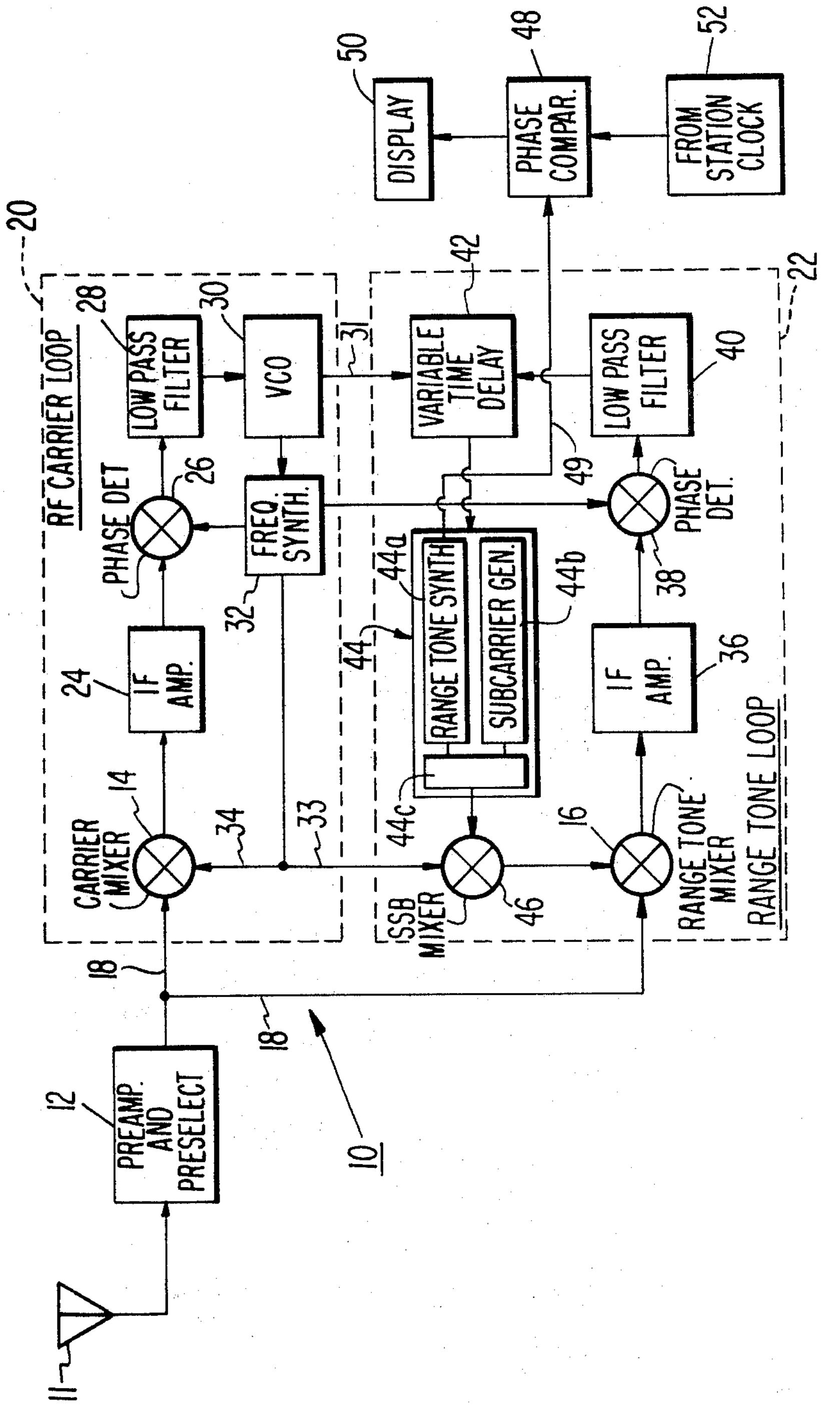
FIG. 2 is a simplified block diagram of a range aided and time dissemination receiver according to the invention.

There is shown in FIG. 2 a simplified block diagram of a time dissemination receiver illustrating the principle of the invention wherein the RF carrier from the orbiting satellite is sensed and is used to provide for continuous updating of a range measurement.

Signals comprising a carrier base band of suitable frequency, preferably in the MHz or GHz ranges, and a subcarrier with a plurality of adjacent range tones separated from the carrier and subcarrier by suitable and well-defined spacing, as will be explained, is received over antenna 11 and amplified and preselected in the preamplifier 12 which amplifies the signals slightly and reduces the intensity of interfering signals outside the bandwidth of preselector 12. The preamplified signals are then conducted to the carrier mixer 14 and the range tone mixer 16 over conductors 18. The receiver includes an RF carrier loop 20 and range tone loop 22. The carrier loop 20 comprises the carrier mixer 14, an IF amplifier 24, a phase detector 26, a low pass filter 28, a voltage control oscillator 30, and a frequency synthesizer 32, one output from the frequency synthesizer being returned to the carrier mixer over conductor 34. The carrier loop components just described are conventional and well known. However, the phase lock loop 20 is used in the present invention as a frequency divider, as will be explained. Loop 20 is arranged to provide a voltage control oscillator (VCO) frequency that is always a fixed percentage of the received carrier frequency, regardless of the carrier Doppler shift.

When the carrier loop 20 is phase locked to the received carrier, the frequency of VCO 30 is arranged to follow the Doppler shift associated with the fundamental VCO frequency in the same ratio as the Doppler shift of the carrier frequency to the carrier frequency.

The known frequency relationship between the carrier frequency and each of the range tone frequencies is utilized in the range tone loop 22. When both the range tone and carrier frequencies are synthesized from a common frequency source such as a crystal oscillator, their frequency relationship is held fixed even if a Doppler shift is encountered. According to the present invention, the VCO 30 is used as a frequency source to synthesize both the carrier frequency in the carrier phase locked loop and the range tone frequencies for use in the range tone loop so that the same relationship between the carrier and range tone frequency ratios is maintained, regardless of Doppler shift.

The synthesized range tones in the receiver are frequency coherent with the range tones received from the satellite, but they are not necessarily phase coherent. The phase coherency or correlating function is accomplished by the range tone loop 22. The range tone loop 22 includes a range tone mixer 16 coupled to a narrow band IF amplifier 36, in turn, coupled to a phase detector 38, a low pass filter 40, a variable time delay 42, coupled to a multi-tone generator 44. The output of the tone generator 44 is coupled both to a single side band mixer 46 and a phase comparator 48. The output of the phase comparator 48 is coupled to a display 50 such as a digital print-out. The phase comparator is timed from a station clock 52 such as an atomic-referenced source.

The multi-tone generator 44 includes a range tone synthesizer **44*a*, a subcarrier generator 44*b* and a digital SSB mixer 44*c*. The multi-tone generator 44 developes a signal which, when mixed with the signal from the frequency synthesizer 32 and conducted to the mixer 46 over coupling path 33, causes the range tone loop 22** to be phased locked initially to the subcarrier frequency received from the satellite and subsequentially, in sequence, to each of the range tones from the satellite.

The range tone synthesizer **44*a* generates all of the five range tones which are sequentially mixed with the subcarrier by the SSB mixer 44*c*, and then coupled to the SSB mixer 46. This mixer 46, causes the signals in the range tone loop IF amplifier 36 to be either the subcarrier or the range tone signal. Any phase difference between either the subcarrier or the particular range tone being received and the corresponding synthesized subcarrier or range tone causes an error signal to exist in the range tone low pass filter 40. If no phase difference exists between the received range tone signal and the synthesized range tone signal, the output of the phase detector 38 will be zero indicating a null. Any phase difference between the local signal and the received signal will generate an error signal which will be passed through the low pass filter 40 and coupled to the variable time delay 42.**

The filtered error signal is used to adjust the phase of the signal developed by VCO 30 as applied to the multi-tone generator 44. This is accomplished by the variable time delay circuit 42 of conventional design. The phase of the range tone synthesizer 44a or subcarrier generator 44*b* is adjusted to cause the filtered error signal to diminish in typical phase lock manner. This causes the phase of the synthesized range tones to match the received range tone phase within the error of the phase lock loop.

The next higher range tone is received from the satellite by coupling from the synthesizer 44 to the sSB mixer 46 in the manner previously described for the first tone, the synthesized range tone of corresponding frequency. Since the phase relationship among the several range tones that have been selected for the system use for transmission from each of the several satellites is fixed and known, the initial error in phase lock, that occurs on the second range tone, is equal to the final error due to noise, in phase lock on the first tone multiplied by the ratio of the range tone frequencies. The phase lock error is reduced to a null on the second range tone in a similar manner to that done for reducing the phase lock error for the first range tone with the added restriction that the total change in time of synthesized range tone is less than the period of the higher range tone, thus preserving the ambiguity resolution afforded by the coarse (lower frequency) range tones. This procedure is repeated through all of the range tones that are provided in the system with successive increases in precision effected by the increases in range tone frequency. Since the phase relationship of all range tones is held fixed by the range tone frequency synthesizers in the satellites and the receivers, the phase of the lowest synthesized range tone frequency can be thought of as being brought closer to the phase of the received low range tone frequency as each successive range tone of increasing frequency is observed. For example, if the first range tone, that is, the lowest tone frequency is 100 Hz, time period of 0.01 second and the phase lock error is one percent, the time error will be 100 microseconds, that is, one percent of 0.01 second. If the next higher range tone is 1,000 Hz, the error will be a refinement of one percent of its 1 milliseconds period, that is, 10 microseconds. Thus, it will be understood as the frequency of the tone is increased, the error is proportionately decreased.

In operation, the carrier loop circuit 20 reduces the phase error to substantially zero by nulling, in the manner known in the art. The Doppler shift is represented by the change in delay of the signals between the satellite and the receiver of the the VCO 30. This change causes the phase of the 100 Hz tone of the local synthesizer 44*a* to follow the change in range caused by the Doppler shift. This 100 Hz signal consists of a logic transition which is applied to the phase comparator 48 over conductor path 49, timed by a local clock source 52. The output of the phase comparator is coupled to a display such as a printer which indicates the sum of both the clock error between the satellite and receiver clocks as well as the propagation of the user. The signal output from the local range tone synthesizer is a 100 Hz square wave, which is in phase with the received signal. This output signal can be converted to a measurement of the elapsed time (tau) of transmission between the satellite and the receiver in suitable time units such as nanoseconds or converted to a range in suitable distance units such as miles in a known manner.

An article describing the techniques of passive ranging utilizing such data is published in the Naval Research Review, August 1970, entitled "Optimum Altitudes for Passive Ranging Satellite Navigation Systems" by Roger L. Easton.

As is known in the art a three dimensional fix of the position of a user depending upon the system in which the invention will be used will establish the three orthogonal coordinates for precise spacial position on or over the surface of the earth. As explained in the article by Easton, referred to above, at least three satellites are necessary to transmit signals to a receiver for establishing a three dimensional fix. Thus, if an instantaneous fix were to be required, three receivers embodying the invention would be required to receive instantaneously signals from each of three such satellites. For use in systems having only one receiver, however, it would be apparent to those skilled in the art, that the single receiver can be used, in sequence, to receive signals from each of the three different satellites, in sequence, and correlating the data received from them in a manner known in the art.

It should be noted that the range tones need be sampled only once during which the phase coherency is established between the synthesized range tones and received range tones. Thereafter phase coherency can be maintained until phase lock is lost in the carrier loop 20. This occurs, it is to be noted, even though the range tones are no longer being received. Furthermore, since frequency coherence is established independently of the range tone loop, the effect of Doppler shift on establishing phase coherency of the range tones is reduced to a second-order effect and is of importance only in the presence of large Doppler shift change during the time of phase coherency establishment.

It should be further noted that range tone phase correlation occurs for this embodiment of the invention at the front-end of the narrow band amplifier 36. Thus the effects of large IF amplifier delays on phase measurement precision is reduced to negligible values by front-end correlation.

Figure 4:
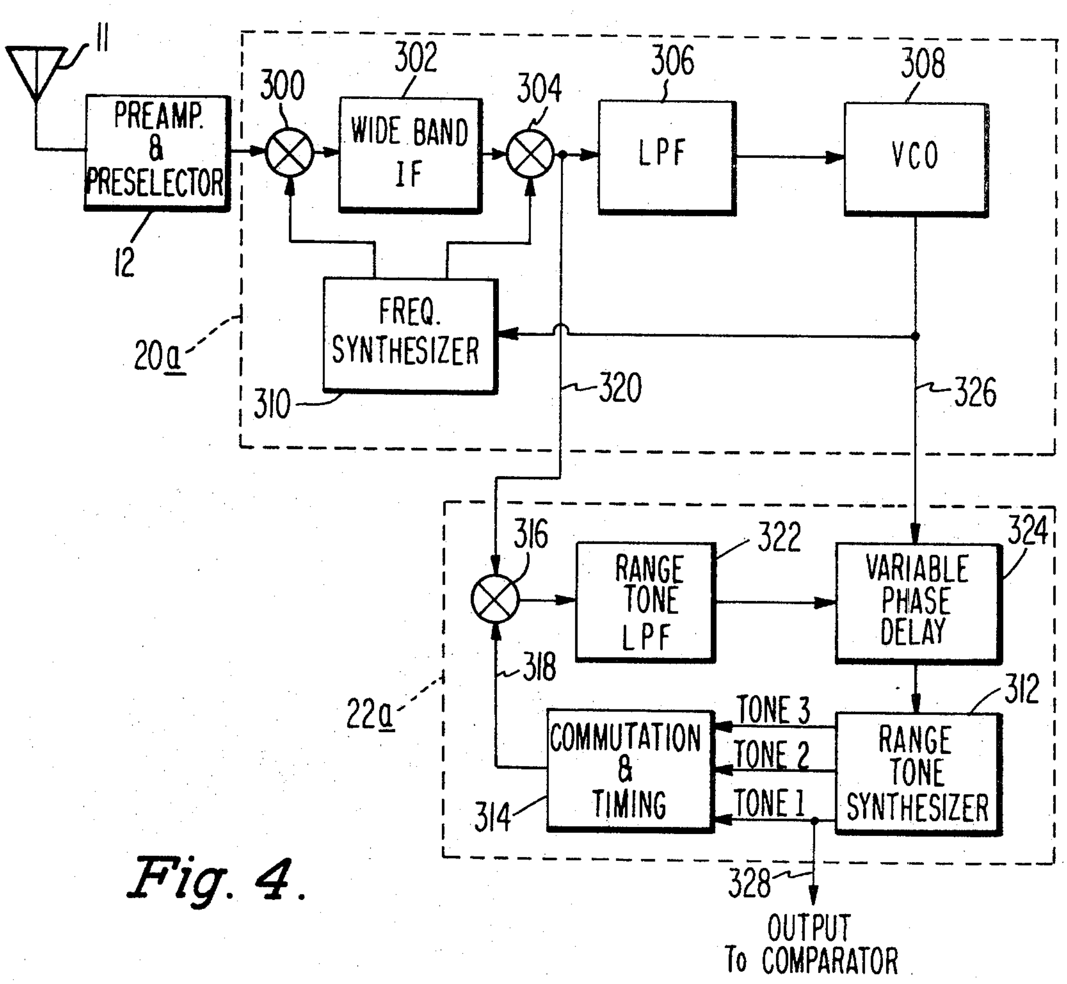
FIG. 4 is a simplified block diagram of a modified form of a receiver of the invention.

Front-end correlation is useful whenever ranging precision on the order of tens of nanoseconds are desired. When lesser precisions are required such as the case for a non-military navigation equipment of aircraft navigation for domestic purposes, the usefulness of the invention is accomplished in a receiver which provides for rear-end correlation of the range tones rather than front-end correlation. FIG. 4 is a block diagram of such a rear-end correlation rate aided range time dissemination receiver. The carrier is tracked in like manner as was described for the system shown in FIG. 2. The system as modified for this embodiment of the invention includes the antenna 11 processing received signals from the satellite through the preamplifier and preselector 12. The carrier is tracked by the phase lock loop 20*a* consisting of a mixer 300, wide band IF amplifier 302, phase detector 304, a low pass filter 306, a VCO 308, and a frequency synthesizer 310. This carrier tracking loop 20*a* is similar to that of FIG. 2. The only difference between the two loops is in the bandwidth of the IF amplifier. For the rear-end correlation form of receiver the bandwidth of IF amplifier must be broad enough to pass all of the range tones of interest, whereas in the loop 20 (FIG. 2) the bandwidth of IF amplifier was required only to be wide enough to pass the IF frequency ± the small amount of Doppler shift associated with that carrier. The set of range tones is synthesized in the tone loop 22*a* by a range tone synthesizer 312. The tones are further commutated by a commutation and timing circuit 314 and applied to the phase detector 316. The phase of the commutated tones on conductor 318 is compared with the phase of the detected tones on conductor 320, the detection process being accomplished in mixer 304 of the carrier tracking loop 20*a*. The phase error, as demodulated by the phase detector 316, is filtered by the range tone low pass filter 322 and supplied to the variable phase delay 324, which adjusts the phase of the VCO signal 308 over conductor 326 being supplied to the range tone synthesizer 312.

The major difference between the performance properties of a rear-end correlation receiver (FIG. 4) as compared to a front-end correlation receiver, (FIG. 2) are in terms of the accuracies obtainable. In the rear-end correlation receiver (FIG. 4) reliance is made on the stability of the propagation delays in the wide band IF amplifier and also in the ability to get sufficient signal in the mixer 304 to be above threshold detection for the carrier tracking loop to function. The number of tones produced by the range tone synthesizer 312 is dependent upon the desired accuracy and the resolution required for unambigious range requirement. The highest range tone frequency employed is dependent now upon the precision requirement and the lowest range tone frequency determined by the ambiguity requirement. The output of the receiver is the fast rise time square wave on conductor 328 and is conducted to the phase comparator similar to the previous receiver case such as block 48 on FIG. 2.

It should be noted that in the rear-end correlation receiver just described, a range tone subscriber was not used. A subcarrier may be used as a reference signal for the phases of the range tones. In a rear-end correlation type receiver, the carrier frequency itself may be used as the reference signal.

It should be noted that the accuracies available with front-end correlation is on the order of nanoseconds while rear-end correlation receiver accuracies is on the order or microseconds or tenths of microsecond. Calibration techniques and equipment known in the art will improve the accuracy of a rear-end correlation receiver to a significant order. In practice, the modulated carrier signals that are transmitted from he satellite 124 to the users receiver station 114 (FIG. 1), for all forms of the invention are programmed for transmission under a ground control command over signal path 126. The signals are processed in the receiver (FIGS. 2, 3, 4) in a sequential manner corresponding to the sequence of the received signals.

Figure 5:
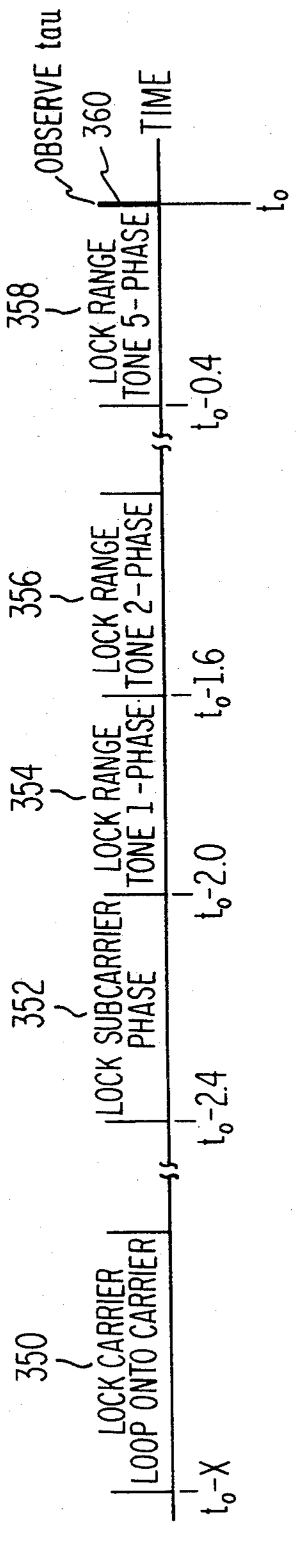
FIG. 5 is a timing diagram showing the sequence of range tones to the observation time of tau.

Referring now to FIG. 5 there is shown a diagram illustrating the timing sequence of the several portions of the signals modulated on the carrier. The RF carrier is continuously transmitted. Starting 2.4 seconds prior to each minute mark ($t_o$), the sequence of subcarrier and range tones are transmitted culminating at the minute mark ($t_o$) when the transmission of the last range tone (tone 5) has been completed. The receiver sequence starts during the time period when only the carrier is being transmitted by the satellite, at which time (350, FIG. 5) the carrier tracking loop is locked onto the transmitted carrier. Then, at precisely 2.4 seconds prior to the minute mark ($t_o$), the receiver is arranged to search for and lock onto the then transmitted subcarrier signal during the period 352. The timing of this function is provided either by the station clock or by a detector within the receiver to detect the presence of the subcarrier. This timing is usually accurate to within approximately 1 millisecond of error. The receiver is arranged to synchronize the subcarrier phase of the synthesized subcarrier to the received subcarrier prior to the end of period 352 (FIG. 5). At time $t_o - 2.0$ seconds, which is the start of phase of 354 (FIG. 5), the first range tone (tone 1) will be transmitted by the satellite. The range tone phase is nulled with the range tone loop in the receiver during the phase 354. In sequence, thereafter, the remaining range tones are phased nulled until the highest range tone frequency (tone 5) is observed (358) between the time $t_o - 0.4$ to $t_0$. At time $t_o$ (360) an observation is made by the receiver in the automatic mode. Should further observations of the time difference between the satellite clock and the user clock be required, they may be accomplished at will as long as the carrier tracking loop (20) maintains track on the transmitted carrier.

It will be understood by those skilled in the art that the invention as embodied in a receiver illustrated in the block diagram of FIGS. 2 or 4 does not include the details of the logical components and circuits required to accomplish the synchronization of the receiver timing with the signals received from the satellite as just described in FIG. 5. The implementation of such components and circuits are well known in this art and in view of the description herein will be readily apparent to those skilled in this art.

It will now be appreciated that a receiver made in accordance with this invention accurately measures propagation delays from a satellite transmitting time dissemination signals. This receiver is incorporated in a passive (one-direction transmission) ranging system that compares the phases of the received signals with an accurate clock source such as an atomic standard. The reference phase of the tone signals received from the satellite are determined by correlation of the signals at the receiver. The relative phases are determined and measured by translating, in frequency, a phase locked loop to each frequency transmitted by the satellite while maintaining substantially constant any receiver propagation delays through correlation at the front-end of the receiver. If rear-end correlation is used, the variations in receiver delay of the signal must be accepted as errors.

More accurate clock synchronization can be achieved by processing the satellite signals on two different carrier frequencies in order to negate the ionospheric refraction effect by using known multiple frequency techniques. Thus, as for the TIMATION II system, one receiver is designed to process the 400 MHz modulated carrier signals and another the 150 MHz modulated carrier signals.

It will be appreciated by those skilled in this art that the particular requirement for each of the different carrier frequencies may be implemented by suitable component and circuit design techniques known in the art.

Detailed Description of a 400 MHz Receiver

Figure 3A:
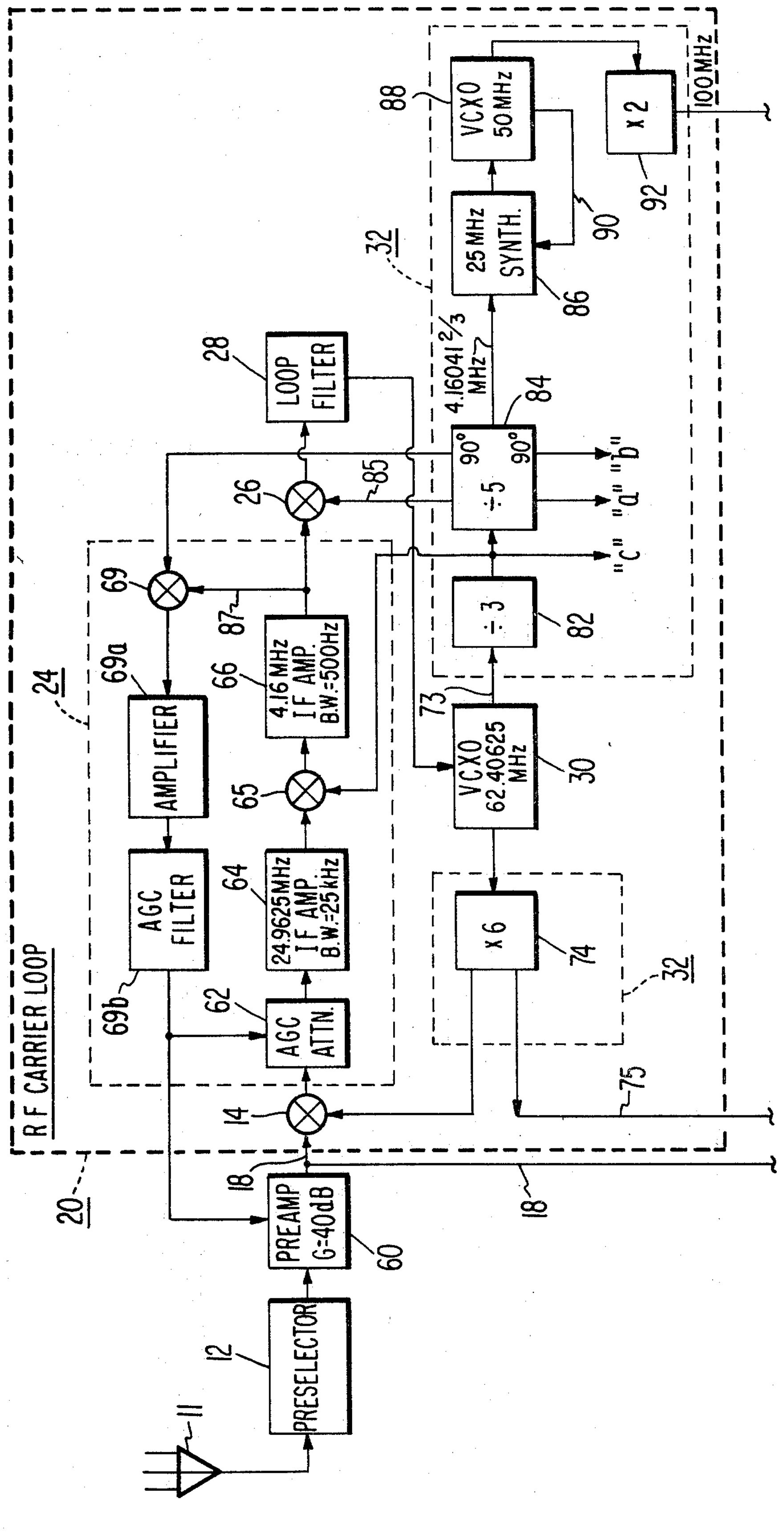
FIGS. 3*a* and 3*b* are block diagrams in greater detail of the receiver adapted for the 400 MHz operating range of frequencies.
Figure 3B:
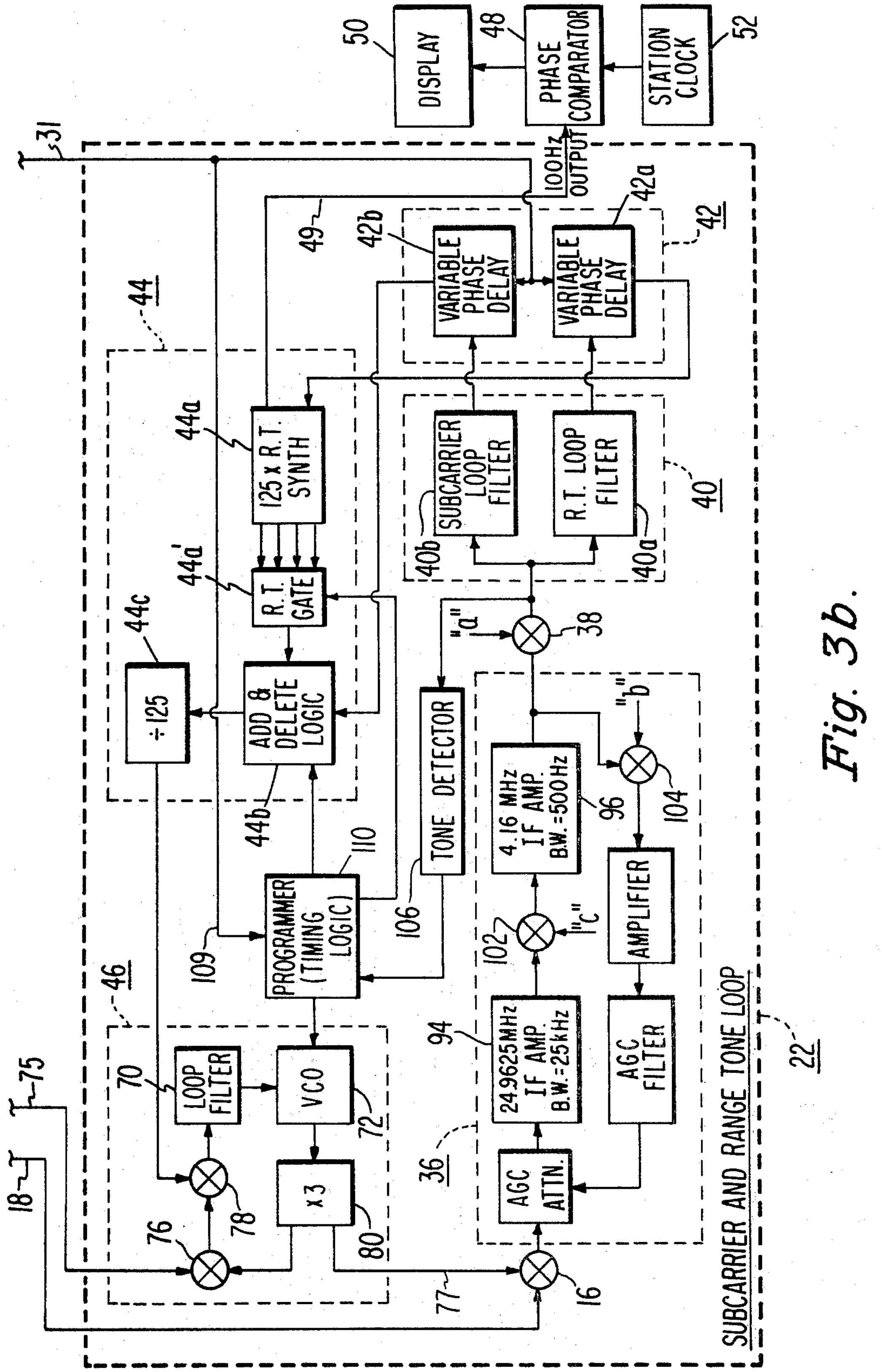

Referring now to FIG. 3 there is illustrated in block schematic form a specific design of a receiver embodying the invention for use with a 399.4 MHz carrier and associated range tones of 100, 1,000 10K, 100K and 900K Hz, each modulated on a subcarrier of 399.0 MHz. Groups of block units corresponding to those of FIG. 2 are identified with the same reference numerals within dotted line blocks. The antenna 11 is coupled to a preselector 12 which in turn is coupled to a preamplifier 60 having a gain of 40 DB. The output of the preamplifier 60 is coupled over conductors 18 to the carrier mixer 14 and the range tone mixer 16. The carrier loop 20 provides for double conversion and AGC. The loop 20 consists of an IF amplifier 24 (FIG. 2) comprising an automatic gain control attenuator 62 coupled to an IF amplifier 64 tuned to the frequency indicated with a bandwidth 25 kHz. The output of the IF amplifier 64 is coupled to a mixer 65 which in turn is coupled to the second IF amplifier 66 through the phase detector 26 coupled to the loop filter 28 whose output is applied to a voltage controlled crystal oscillator (VCXO) 30 having a frequency of operation as indicated. The crystal oscillator output 30 is passed through a multiplier 74 for multiplying the frequency by a factor of six, the output of the multiplier 74 being applied to the carrier mixer 14 and the first mixer 76 of the single side band mixer 46. The output of mixer 76 is applied to a second mixer 78 which is coupled to a loop filter 70, which in turn is coupled to a voltage control oscillator (VCO) 72. The frequency output of VCO 72 is multiptied by the factor of three by the multiplier 80 whose output is applied back to the mixer 76 and to the range tone mixer 16. The crystal oscillator 30 has an output also coupled to the synthesizer 32 over conductor 73 for developing different frequencies of values as indicated for use at different portions of the receiver. The output frequency at 73 is first divided by three by a suitable frequency divider 82, the output of which is coupled to another divider 84 having several outputs which are coupled to the detector 26 and the 25 MHz synthesizer 86. The divider 84 is a conventional digital by five divider with quadrature outputs. The output of divider 82 is also coupled to the mixer 65. The outputs identified as *a*, *b*, and *c* are coupled to the range tone loop 22 as indicated. The 25 MHz synthesizer 86 is coupled to the 50 MHz voltage control oscillator 88 which in turn is phase locked to the synthesizer 86 over the feedback loop 90. The output of the VCXO 88 is multiplied by a factor of two by multiplier 92 and coupled to the range tone loop 22 to a pair of variable phase delays 42*a* and 42*b* via path 31.

The carrier loop 20 processes the received carrier signals having a center frequency of 399.4 MHz which after the preamplifiers 12 and 60 are applied to the first mixer 14. The converted frequency of 24.9625 MHz is amplified by amplifier 64 and again converted at the second mixer 65 to 4.16 MHz and applied to the mixers 26 and 69. The feedback path comprising the mixer 69, amplifier 69*a*, and AGC filter 69*b*, provides for a stabilized AGC loop of conventional design. The carrier phase detector 26 compares the phase of the output of the second IF amplifier 66 and the reference signal on path 85. The output of phase detector 26 is applied to loop filter 28 and thence to VCO 30 for conventional control of the phase locked loop. Thus, the frequency of the VCO 30 is shifted the same percentage as the carrier frequency is shifted by effects such as Doppler. The same percentage shifts, it should be noted, are effected for all frequencies generated by the synthesizer 32.

The translation loop 46 mixes the carrier local oscillator frequency derived from the oscillator 30 with the range tone or offset frequency synthesized in the multitone generator 44. The translation loop 46 is preferably formed of two double balanced mixers of suitable design that are provided with a wide pass band so that its phase stability is essentially that of the carrier VCXO 30 since it must be phase stable during the period that it receives a burst of range tones from the receiver synthesizer 44. A phase locked tracking filter 70 is employed to provide additional unwanted side band and carrier rejection.

The subcarrier and range tone loop 22 is formed of dual conversion IF amplifiers 94 and 96, a range tone (RT) loop filter 40*a*, a second mixer 102. This loop 22 is arranged to process the subcarrier at 399,0 MHz and the range tone frequencies previously enumerated that are received through the antenna 11. The loop 22 is further arranged to provide error signals to the subcarrier phase delay 42*b* and the range tone phase delay 42*a* in order to phase lock internally generated range tones to the received range tones and the internal generated subcarrier to the received subcarrier.

The process of correlating the phases of the internally synthesized range tones and the received range tones will now be described. The first step in this correlation process is the calibration or establishing of a reference phase of the subcarrier. This is accomplished by disabling the output of the range tone synthesizer 44*a* and 44*a'* and providing out of the multi-tone generator 44 only the subcarrier frequency. This is translating the local oscillator signal over path 75 by the frequency of the subcarrier. This translated frequency appears as the signal on path 77 to mixer 16. The signal on path 77 is mixed with the signal on conductor 18, whereby the center frequency of the IF amplifier will contain the subcarrier which has been heterodyned by mixer 16 to that frequency. Phase detector 38 following the IF stage 36 is employed to produce an error voltage proportional to the phase difference between the reference signal *a* and the signal from amplifier 96. This error signal is filtered in subcarrier loop filter 40*b*, and acts on the variable phase delay 42*b* to drive the subcarrier phase in the direction which would cause a zero phase error or null to exist at the output of phase detector 38. Once the output error at the output of 38 has been driven to zero, the locking procedure on the subcarrier is finished. As we then look at the action of the receiver when locking onto the first range tone we see that the range tone synthesizer provides to logic components 44*b* and 44*c*, a frequency which will cause the subcarrier frequency to be offset or singe-side-band-mixed by the range tone frequency. This is accomplished by using digital add and delete logic to cause phase incrementing in a given direction such that the total amount of phase shift per second equals $2\pi$ radians times the frequency of the range tone. This is equivalent to a single-side band mixing operation. Hence, the signal supplied to the single side band mixer 46 from the multitone generator 44 will be the subcarrier frequency offset in frequency by the range tone frequency. The single side band mixer 46 then causes the local oscillator signal on path 75 to be offset by the subcarrier plus range tone frequency, which generates the signal on conductor path 77. In a similar manner to the subcarrier phase lock process, the mixer 16 now produces at its output at the center frequency of the IF amplifier, range tone 1 and that signal is amplified through the IF amplifier and again compared at phase detector 38 for phase discrepancy between the reference frequency *a* and the output of amplifier 96. This phase error signal is then filtered by range tone loop filter 40*a* and that filtered error acts upon the variable phase delay 42*a*. The signal from the variable phase delay 42*a* is applied to the range tone synthesizer 44*a* where the set of range tones are derived. The variable phase delay causes a phase shifting of these range tones in such a direction so as to cause the error appearing at the output of the mixer 38 to become zero. Once the output at 38 has become zero, then that range tone is as it appears in the range tone synthesizer is phase coherent with the incoming received range tone at mixer 16. The remaining range tones are all correlated to their corresponding received range tones in a manner similar to that for the first range tone.

The programmer, which is the timing logic for the entire receiver, is clocked by the 100 MHz signal on lead 109 synthesized by block 90. The programmer logic is represented by block 110 comprising suitable control and timing circuits known in the art. Programmer timing is started by action of a tone detector 106, which senses the presence of the reception of the subcarrier signal from detector 38. In the initial acquisition sequency the IF amplifier 36 and the signal on path 77 are aligned to provide reception of a subcarrier frequency. Therefore, when no signals are present the tone detector 106 will not have an output and the programmer will remain in an acquisition mode. As soon as the subcarrier signal is detected by the tone detector 106, then the programmer logic is started. The programmer timing logic 106 serves to gate which of the particular range tones should be observed at any particular time and also controls the receiver if resequencing should be required. The range tone synthesizer 44*a* generates a 100 Hz fast-rise-square-wave on conductor 49 as an input signal to the phase comparator 48. In this phase comparator 48, the station clock 52 100 Hz square wave and the fast rise time 100 Hz output are compared and the time difference is displayed in display 50 for the purposes and uses described above, particularly with reference to FIG. 2.

What is claimed:

1. A receiver for receiving ranging signals, said ranging signals comprising a continuous carrier and at least two side band signals of relatively lower and higher frequencies transmitted intermittently, the respective frequencies of said side band signals having a fixed predetermined relation to the frequency of said carrier comprising:

a. a carrier loop including a carrier mixer, an IF amplifier coupled to the output of said carrier mixer, a phase detector coupled to the output of said IF amplifier, and providing a control signal to a voltage controlled oscillator (VCO) whose output frequency is locked to the frequency of the received carrier, and a frequency synthesizer synchronized to the frequency of the VCO and providing an output signal coupled to said carrier mixer, b. a side band loop including a variable delay, a variable phase side band signal synthesizer coupled to said variable delay and responsive thereto for phase adjustment of the synthesized signals, and a side band mixer coupled between said side band synthesizer and said variable delay, b1. said variable delay being coupled to said VCO for generating a phase control signal to said side band signal synthesizer to null phase error in said side band loop, b2. said side band singal synthesizer in response to said variable delay generating signals having a phase and frequency corresponding to said side band range signals, b3. said side band mixer having an input from said carrier loop frequency synthesizer for mixing therewith a signal from said side band signal synthesizer, c. means responsive to said side band signals for controlling said side band signal synthesizer to generate a synthesized side band signal substantially in synchronism and frequency correspondence with the received side band signal, whereby said side band loop is nulled by correlating each received side band signal with the corresponding synthesized side band signal, and d. output means from said side band loop for continuously generating an output signal corresponding to the side band signal of the lower frequency whereby said output signal includes substantially instantaneous Doppler variations of said ranging signal in response to the received carrier, said output signal being periodically synchronized to said side band signals by sampling said received side band signals during said intermittent transmissions.

2. A receiver according to claim 1 wherein said received side band signals are coupled to said side band loop from a position prior to the input of said carrier loop IF amplifier, whereby correlation of the received side band signals is provided independent of inherent delays in said IF amplifier.

3. A receiver according to claim 1 wherein said received side band signals are coupled to said side band loop from a position after the output of said carrier loop IF amplifier, said IF amplifier having a bandwidth equal to the sum of the side band frequencies whereby correlation of the received side band signals with the synthesized side band signals is provided subsequent to the output of said carrier loop IF amplifier.

4. A receiver according to claim 2, wherein said side band loop includes a second mixer coupled from the output of said first mentioned side band mixer and said received ranging signals, a side band loop IF amplifier having an input coupled to the output of said second mixer, and an output coupled to a phase detector, said phase detector in response to signals coupled from said carrier loop frequency synthesizer providing phase control signals for said variable delay.

5. A receiver according to claim 1 including five side band signals related to each other by a factor of ten, the lowest frequency being 100 Hz.

6. A receiver according to claim 2 wherein said carrier loop IF amplifier is adapted to amplify only a band of frequencies corresponding to one of said signal frequencies comprising the group consisting of said carrier, and either of said side band signals.

7. A method of operating a receiver for ranging signals of the form having a continuous carrier and at least two periodically transmitted side band signals, comprising the steps of:

a. locking a voltage controlled oscillator to the frequency of said carrier, b. synthesizing in synchronism with receipt of the respective side band signals a plurality of signal frequencies corresponding respectively to the frequencies of said side band signals, c. locking said synthesized signals to said received signals, d. coupling a signal proportional in frequency to said carrier signal frequency to the locked signals to synchronize the side band signals to Doppler variations of said ranging signals, e. continuously providing an output signal manifesting Doppler variations corresponding to one of said synthesized side band signals, being synchronized to said received side band signals during the receipt of the periodic side band signals.

* * * * *

UNITED STATES PATENT OFFICE
CERTIFICATE OF CORRECTION

Patent No. 3,769,589 Dated October 30, 1973

Inventor(s) Robert Frank Buntschuh and Henry George Rouland

It is certified that error appears in the above-identified patent and that said Letters Patent are hereby corrected as shown below:

Item [22] (page 1) the filing date reading "November 16, 1971" should read --December 16, 1971--; Column 5, line 65 after "propagation" insert --delay of the signals between the satellite and the receiver--; Column 12, line 7 "singal" should read --signal--.

Signed and sealed this 25th day of June 1974.

(SEAL)
Attest:

EDWARD M.FLETCHER,JR.
Attesting Officer

C. MARSHALL DANN
Commissioner of Patents

USCOMM-DC 60376-P69
☆ U.S. GOVERNMENT PRINTING OFFICE 1969 O—366-334